United States Patent
Towfiq

(10) Patent No.: US 9,915,525 B2
(45) Date of Patent: Mar. 13, 2018

(54) INTERFEROMETRIC MEASUREMENT METHOD FOR END FACE SURFACE ANGLE OF MULTI-FIBER FERRULES AND CONNECTORS

(71) Applicant: Farhad Towfiq, Oceanside, CA (US)

(72) Inventor: Farhad Towfiq, Oceanside, CA (US)

(73) Assignee: Sumix Corporation, Oceanside, CA (US)

( * ) Notice: Subject to any disclaimer, the term of this patent is extended or adjusted under 35 U.S.C. 154(b) by 0 days.

(21) Appl. No.: 14/744,314

(22) Filed: Jun. 19, 2015

(65) Prior Publication Data

US 2016/0370178 A1  Dec. 22, 2016

(51) Int. Cl.
*G01B 9/02* (2006.01)
*G01B 11/26* (2006.01)
*G01M 11/00* (2006.01)

(52) U.S. Cl.
CPC ............. *G01B 11/26* (2013.01); *G01M 11/30* (2013.01)

(58) Field of Classification Search
CPC ...... G02B 6/3834; G01B 11/26; G01B 11/27; G01B 11/272; G01M 11/30
See application file for complete search history.

(56) References Cited

U.S. PATENT DOCUMENTS

| | | | | |
|---|---|---|---|---|
| 5,636,020 A | * | 6/1997 | Csipkes | G01B 11/24 356/477 |
| 6,215,555 B1 | * | 4/2001 | Chivers | G02B 6/3833 356/511 |
| 6,331,081 B1 | * | 12/2001 | Ohtsuka | G02B 6/2552 385/51 |
| 6,705,767 B1 | * | 3/2004 | Dean, Jr. | G01B 9/02 356/477 |
| 6,786,650 B2 | * | 9/2004 | Dean, Jr. | G01B 9/02 385/147 |
| 2004/0013394 A1 | * | 1/2004 | Norland | G02B 6/3807 385/137 |
| 2004/0101255 A1 | * | 5/2004 | Dean, Jr. | G01B 9/02 385/85 |
| 2005/0036742 A1 | * | 2/2005 | Dean, Jr. | G02B 6/3885 385/71 |
| 2016/0259130 A1 | * | 9/2016 | Towfiq | G02B 6/385 |

\* cited by examiner

*Primary Examiner* — Hwa Lee

(74) *Attorney, Agent, or Firm* — Loza & Loza, LLP; Heidi Eisenhut

(57) ABSTRACT

An interferometric measurement method aims at calculating end face surface angle of multi-fiber connector or ferrule taking into account parallelism deviation angles of the connector or ferrule guide holes. The parallelism deviation angles are measured by scanning the side surfaces of guide pins inserted into the guide holes, which is done simultaneously with the end face scanning. Interferometric data from connector or ferrule end face and side surfaces of the guide pins is gathered during one scanning session—either one simultaneous scan or several scans without moving or re-inserting the connector or ferrule.

2 Claims, 7 Drawing Sheets

INTERFEROMETRIC MEASUREMENT METHOD FOR END FACE SURFACE ANGLE OF MULTI-FIBER FERRULES AND CONNECTORS

CROSS-REFERENCE TO RELATED APPLICATIONS

Not applicable.

BACKGROUND

Field of the Invention

The present invention relates to the field of measuring the geometry of multi-fiber optic ferrules and connectors by means of interferometric microscopes. More specifically, the invention relates to interferometric measurement of end face surface angle.

Description of the Related Art

Manufacturers of fiber optic connectors seek ways to produce the connectors with low transmission loss and low back reflection. End faces of fiber optic connectors must satisfy certain criteria for effective fiber mating as required by the industry standards. They must be clean and their surface geometry must provide for good physical contact and low signal loss.

Connector manufacturing procedure includes end face polishing for achieving the surface parameters that ensure good mating of the connectors in plugs. End face flatness needs to be verified that can be done by measuring the end face surface angle.

International Electrotechnical Commission standard IEC 61-300-3-30 defines surface angle as the angle between a reference plane which is perpendicular to the average guide pin axis and the connector end face surface.

The end face parameters, including the surface angle, are measured in an interferometric system. Special fixtures for positioning the connectors in the system are used. In case of multi-fiber connectors, the fixtures enable precise connector alignment in the interferometric system with the use of two guide pins. In the same way, in multi-fiber connector plugs two guide pins enable precise alignment between mating male and female connectors to minimize the optical insertion loss, The fixtures are accurately adjusted and calibrated before measurement so that calibration angles of the pins relative to the optical axis of the interferometric microscope are known. The surface angle is calculated as the angle between the surface end face plane and a reference plane perpendicular to the optical axis of the interferometric microscope with known calibration angle correction.

Guide holes of multi-fiber connectors or ferrules are not strictly parallel. There is always some parallelism deviation as demonstrated on FIG. 1. On this figure the reference number 1 represents a multi-fiber connector or ferrule, the top image being the top view of the connector or ferrule and the bottom image being its side view.

Reference plane 5 is perpendicular to the optical axis 2 of the interferometric system. When guide pins 3 and 3' of a fixture are inserted into the connector guide holes which have some deviation from being parallel, the guide pins become deviated too. The alignment angle of pins is changed. The reference number 6 demonstrates deviation angle of one of the guide pins. In the same way, the other guide pin has a deviation angle as well.

Since during the surface angle calculation the deviation angle is not taken into account, the measured angle value has some calculation error.

The present invention suggests measuring precise alignment angle of the guide pins by scanning them from side together with inspecting the connector end face in one measurement or in several subsequent measurement without re-inserting the connector or ferrule. The measured values of the angles between the guide pin axes are taken into account when calculating the surface angles. Such surface measurement method allows to increase measurement accuracy by considering the deviation angle of the guide pins in calculations.

There is a known method for determining precise orientation of the axis of guide pin holes of a multi-fiber ferrule and precise angle of the ferrule (see Dean et al. US Patent Publication US 2004/0101255)

The present invention employs the same technique of measuring fiber optic connectors as described in a related patent application by the same inventor (see Towfiq, F., (2015) U.S. patent application Ser. No. 14/697,784). The interferometric data is obtained from a side face of the guide pins which allows to measure the alignment angles of the guide pins of the connector or ferrule with two degrees of freedom.

SUMMARY OF THE INVENTION

The present method aims at interferometric measurement of surface angle of multi-fiber connectors and ferrules that takes into account precise alignment angle of the guide holes. The main concept of the present method is obtaining the interferometric data simultaneously from multi-fiber connector or ferrule guide pins by scanning them from side, and from the connector end face. The guide pins can be present in a male connector or can be inserted into a female connector or ferrule from a special fixture used for connector positioning.

The measurement is performed in an interferometric system with the help of special fixtures for simultaneous scanning of side face and end face. The special fixtures position the connector or ferrule so that its end face is approximately perpendicular to the optical axis of the interferometric microscope and the axes of its guide holes are parallel to it.

The special fixtures also contain a mirror element that turns the image obtained from the guide pins and directs it into the interferometer objective. Interferometric fringe patterns are created on the guide pins and on the end face.

The method works well for both multi-fiber female connectors or ferrules and male connectors. The alignment angle is measured for either the guide pins of the male connector or guide pins of the fixture inserted into the guide holes of the female connector or ferrule.

The required surface angles X and Y are calculated from the data obtained during the interferometric scanning First angles X and Y between each guide pin axis and system Z axis are calculated. These angles are then taken into account when calculating end face surface angles. Thus, the resulting angle values consider precise alignment angle of the guide holes.

The provided method can be applied to multi-fiber MTP/MPO connectors and MT ferrules with 2, 4, 8, 12, 16, 24, 48, 72 and other numbers of fibers, of both PC and APC types.

BRIEF DESCRIPTION OF THE DRAWINGS

The presented method can be better understood with reference to the following drawings. Like reference numerals designate corresponding parts throughout several drawings.

REFERENCE NUMERALS IN THE DRAWINGS

| | |
|---|---|
| 1 multi-fiber connector or ferrule | 2 optical axis of interferometric system |
| 3, 3' guide pins inserted into guide holes of the connector or ferrule | 4, 4' guide hole axes |
| 5 reference plane | 6, 6' deviation angles of the guide holes |
| 7 interferometric microscope | 8 opening on the microscope front panel |
| 9 special fixture | 10 mirror element of the fixture |
| 11 fiber holes | 12, 12' guide holes |
| 13 system Z axis | 14, 14' X angles between the system Z axis and the axes of the guide holes |
| 15, 15' Y angles between the system Z axis and the axes of the guide holes | 16 end surface plane |
| 17 guide pins | 18 end surface angle of polish along X axis |
| 19 end surface angle of polish along Y axis | 20 pin axis in mirror |
| 21 perpendicular to connector end face | 22 Y angle between optical axis and pin image in mirror |
| 23 Y angle between optical axis and perpendicular to connector end face | 24 Y angle between optical axis and mirror |
| 25 mirror surface | |

DETAILED DESCRIPTION OF THE INVENTION

Reference will now be made in detail to the presented measurement method illustrated in the accompanying drawings.

Figure 1:
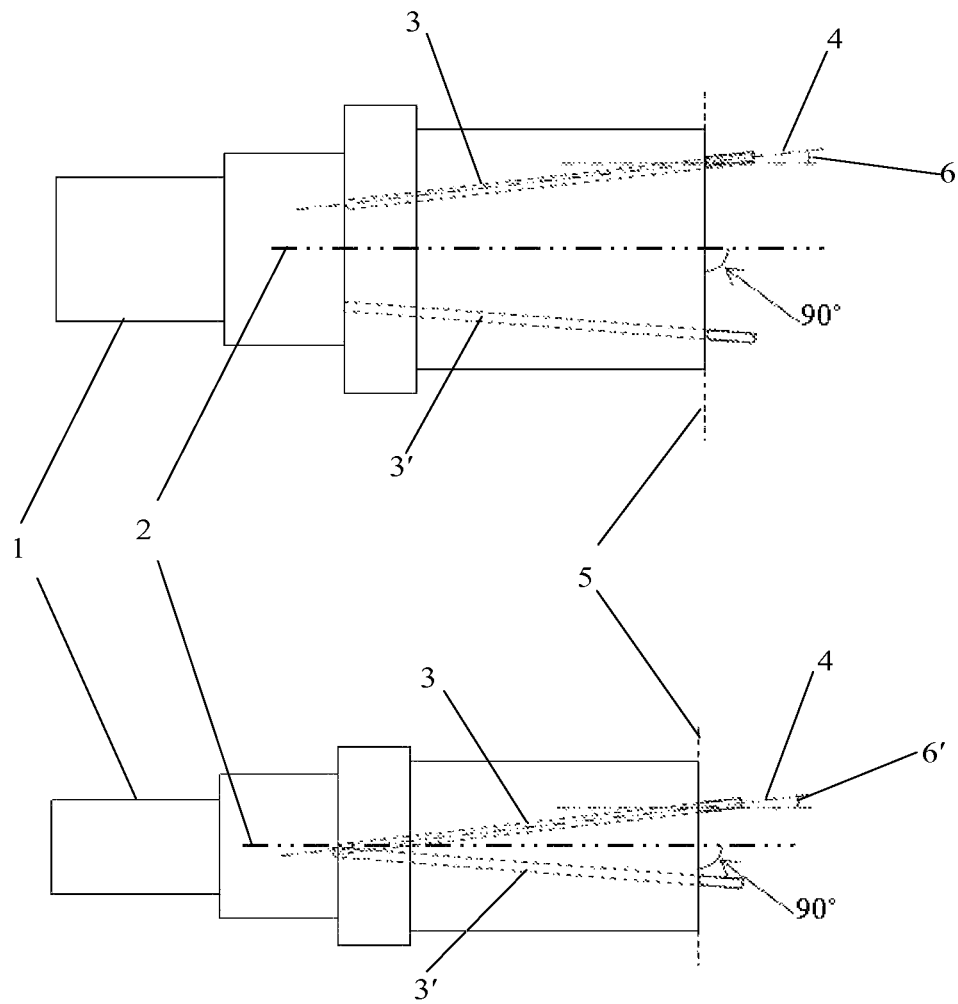
FIG. 1 demonstrates related art problem with surface angle measurement.
Figure 2:
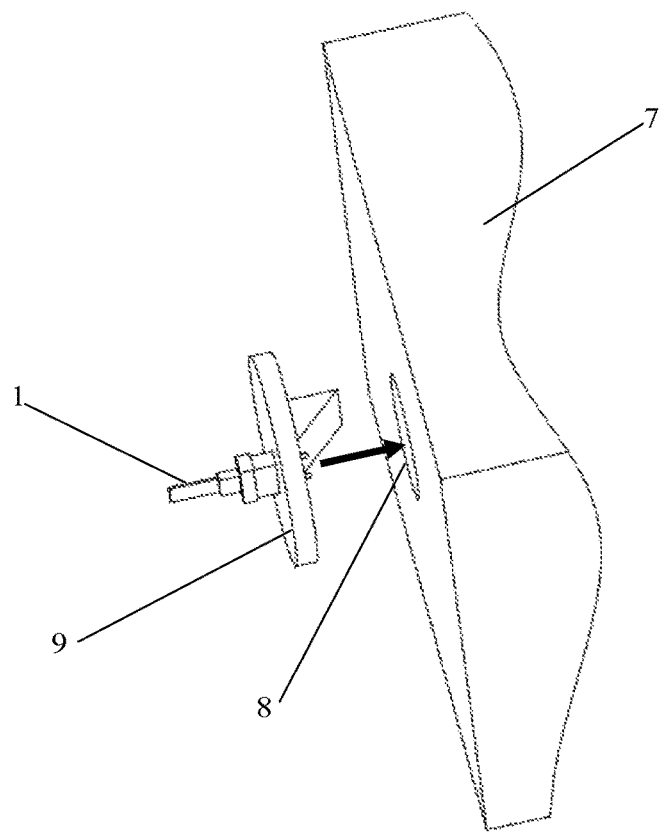
FIG. 2 shows a measurement system being prepared for testing.

FIG. 2 illustrates an exemplary embodiment of the present invention. The reference number 7 represents an interferometric microscope. A special fixture 9 for simultaneous measurements of the connector end face and the side face of the guide pins is mounted on the microscope which has an opening 8 to receive the fixture. A multi-fiber connector or ferrule 1 is inserted into the fixture for interferometric measurements.

Figure 3:
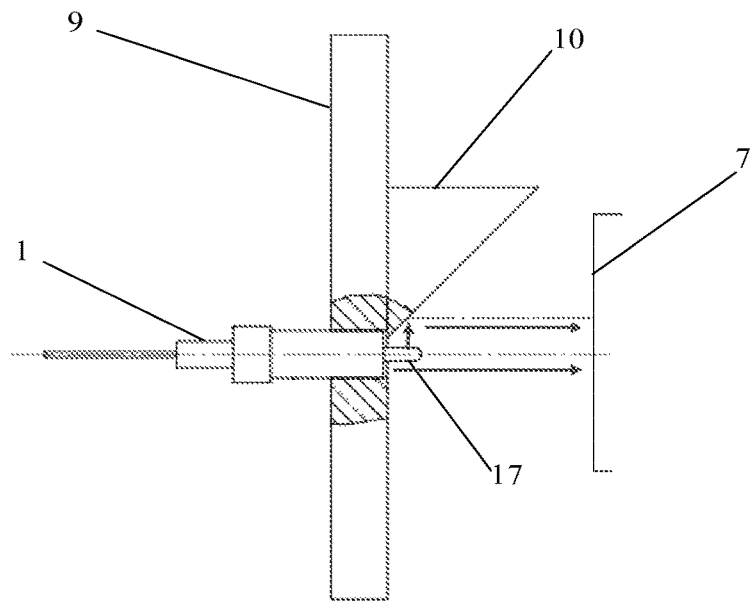
FIG. 3 demonstrates the use of the special fixture in interferometric system.

FIG. 3 provides a section view of the special fixture 9 with inserted connector or ferrule 1. The fixture contains a mirror element 10 that turns the image from guide pins 17. The light from the side surface of the guide pins is reflected from the mirror surface and directed into the interferometer. Thus simultaneous measurement of the connector end face and the side surfaces of the guide pins is possible.

Figure 4:
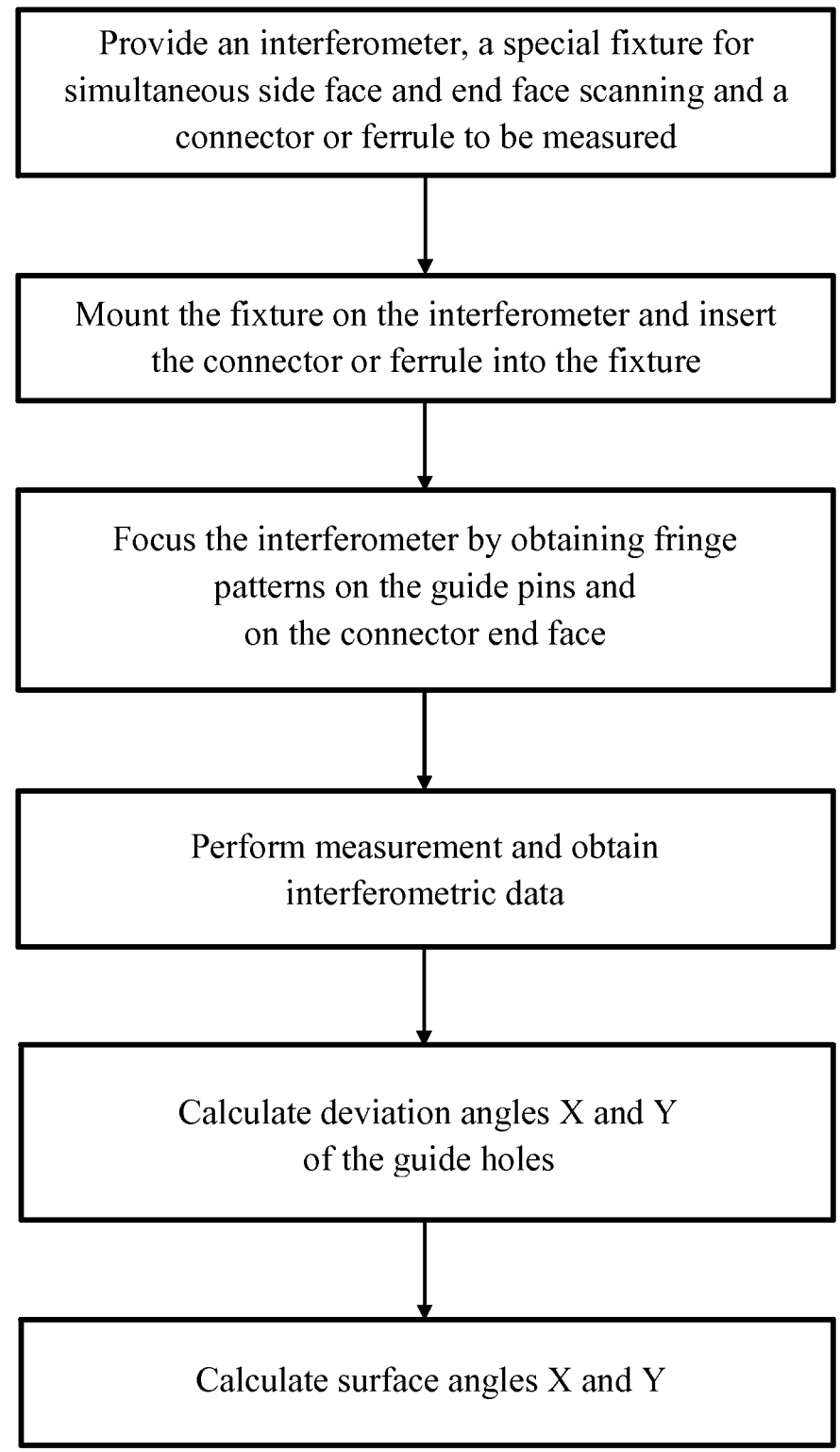
FIG. 4 is a flowchart of the measurement method in accordance with the present invention.

FIG. 4 represents a method flowchart of end face surface angle measurement of multi-fiber connectors or ferrules according to the present invention. The surface angle is measured by an interferometric microscope. Special fixture for simultaneous scanning of the end face and side surfaces of the guide pins is provided together with the microscope for positioning of the ferrule in the measurement system. The special fixture is mounted on the interferometric microscope and the connector or ferrule is inserted into the fixture.

After the connector or ferrule is inserted into the special fixture and is ready for measurements, the interferometric microscope is focused and a fringe pattern is created on the guide pins and the end face of the connector or ferrule. Interferometric data is obtained from the side surfaces of the guide pins and from the end face of the connector or ferrule.

The position of the system Z axis which is the averaged line of the two guide pin holes is determined. Then calculations of alignment angles of the guide holes along axis X and along axis Y are performed.

The final step is calculations of end face surface angles X and Y in which alignment angles of the guide holes along axis X and along axis Y are taken into account.

Figure 5:
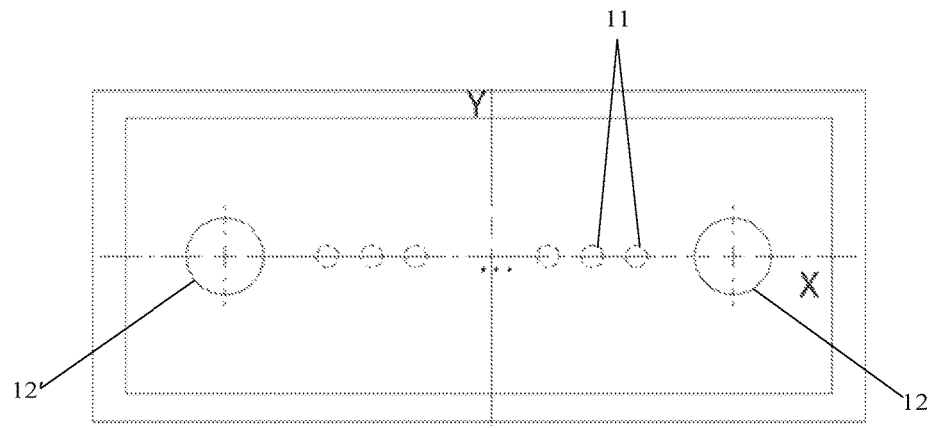
FIG. 5 illustrates the coordinates system.

FIG. 5 explains a system of coordinates X and Y. An X-axis passes through centers of first and second guide holes 12 and 12' on the ferrule end face. A perpendicular Y-axis passes through the midpoint of the line connecting the guide holes' centers.

Figure 6:
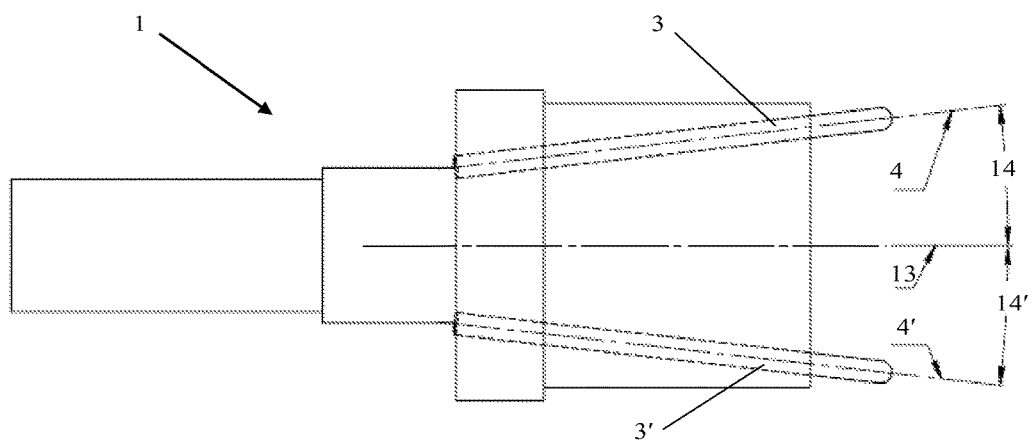
FIG. 6 is a top view of the object being measured with the illustrated guide pin angles.
Figure 7:
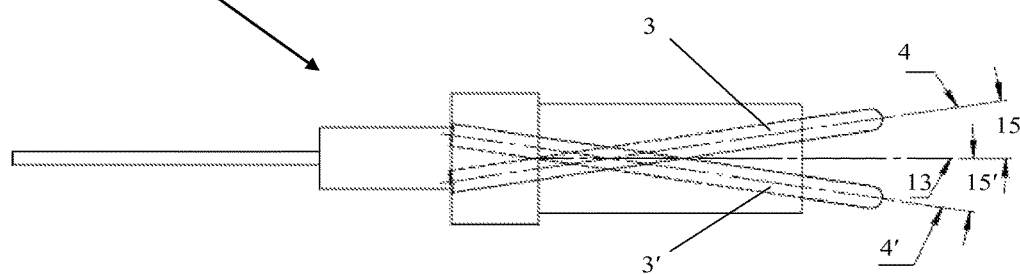
FIG. 7 is a side view of the object being measured with the illustrated guide pin angles.

The top and side views of the connector or ferrule 1 represented on FIG. 6 and FIG. 7 respectively demonstrate relative angles of the axes 4 and 4' of the guide holes with inserted guide pins 3 and 3'. The relative angles of the guide holes represent their alignment angles.

The reference numerals 14 and 14' designate the angles along axis X between the averaged line 13 (the system Z axis) and the guide hole axes 4 and 4' respectively.

The reference numerals 15 and 15' designate the angles along axis Y between the averaged line 13 (the system Z axis) and the guide hole axes 4 and 4' respectively.

Figure 8:
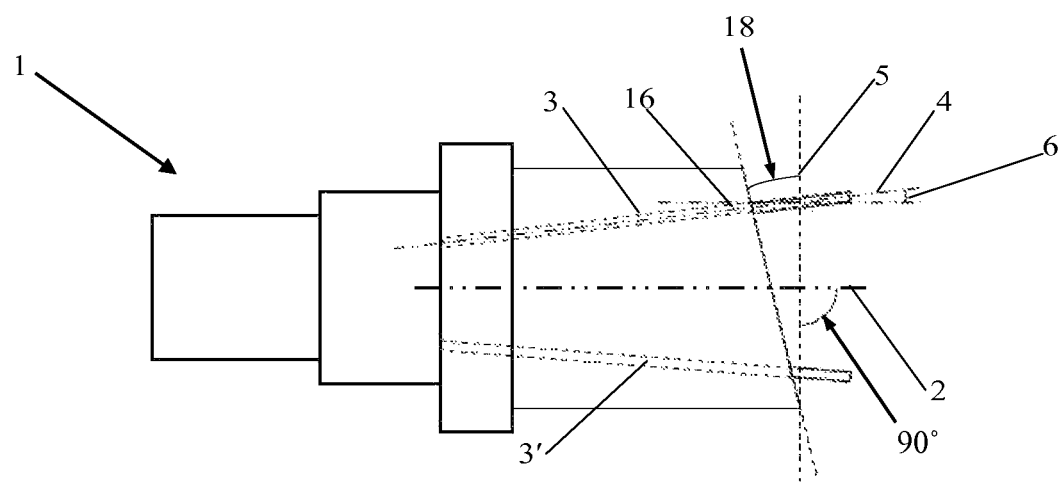
FIG. 8 is a top view of the object being measured with the illustrated surface angle.
Figure 9:
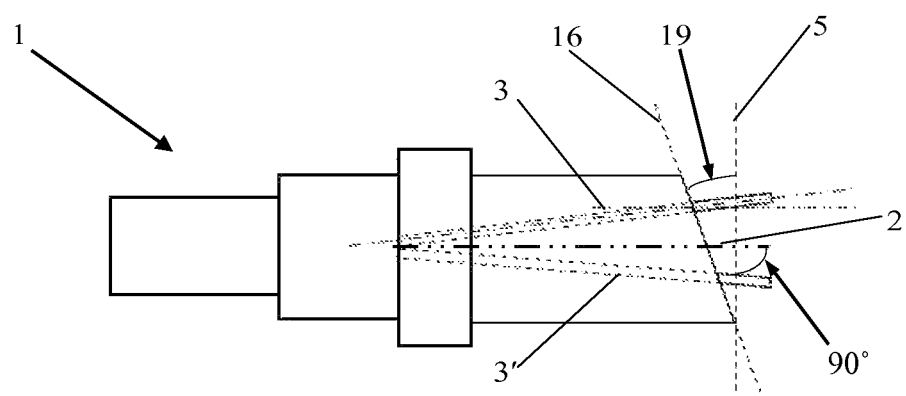
FIG. 9 is a side view of the object being measured with the illustrated surface angle.

The top and side views of the connector or ferrule 1 represented on FIG. 8 and FIG. 9 respectively demonstrate end face surface angles. The surface angles 18 and 19 along axes X and Y are calculated as the angles between the reference plane 5 and the end face surface 16. In the resulting surface angles 18 and 19, the alignment angles 6 and 6' of the guide holes are taken into account.

Figure 10:
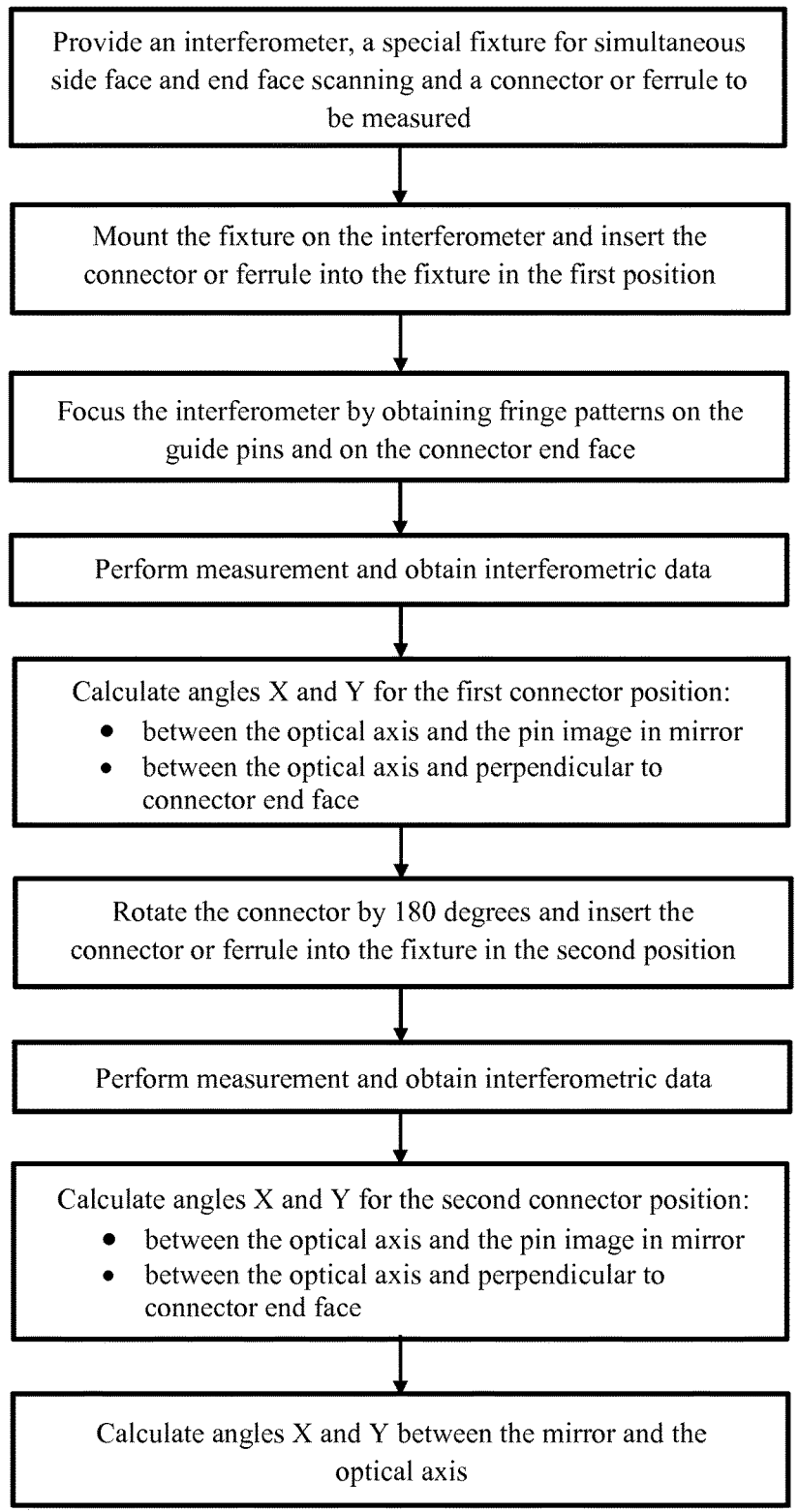
FIG. 10 is a flowchart of calibration of the mirror surface angle of the fixture.

FIG. 10 illustrates the method of calibrating angle of the mirror surface of the fixture that turns the image from the side surface of the guide pins and directs it into the interferometric microscope. The fixture is mounted on the interferometric microscope and the connector or ferrule is inserted into the fixture in its first position.

After the connector or ferrule is inserted into the special fixture and is ready for measurements, the interferometric microscope is focused and a fringe pattern is created on the guide pins and on the end face of the connector. Interferometric data is obtained from the side surfaces of the guide pins and from the end face of the connector.

Angles between the optical axis and the pin image in mirror and between the optical axis and the line perpendicular to the connector end face are calculated for the first position of the connector.

Then the connector is rotated by 180 degrees and inserted into the fixture in its second position. The interferometric microscope is focused again and a fringe pattern is created on the guide pins and on the end face of the connector or ferrule. Second set of the interferometric data is obtained from the side surfaces of the guide pins and from the end face of the connector.

Angles between the optical axis and the pin image in mirror and between the optical axis and the line perpendicular to the connector end face are calculated for the second position of the connector.

The final step is calculation of angles between the mirror surface of the fixture and the optical axis of the interferometric system.

Figure 11:
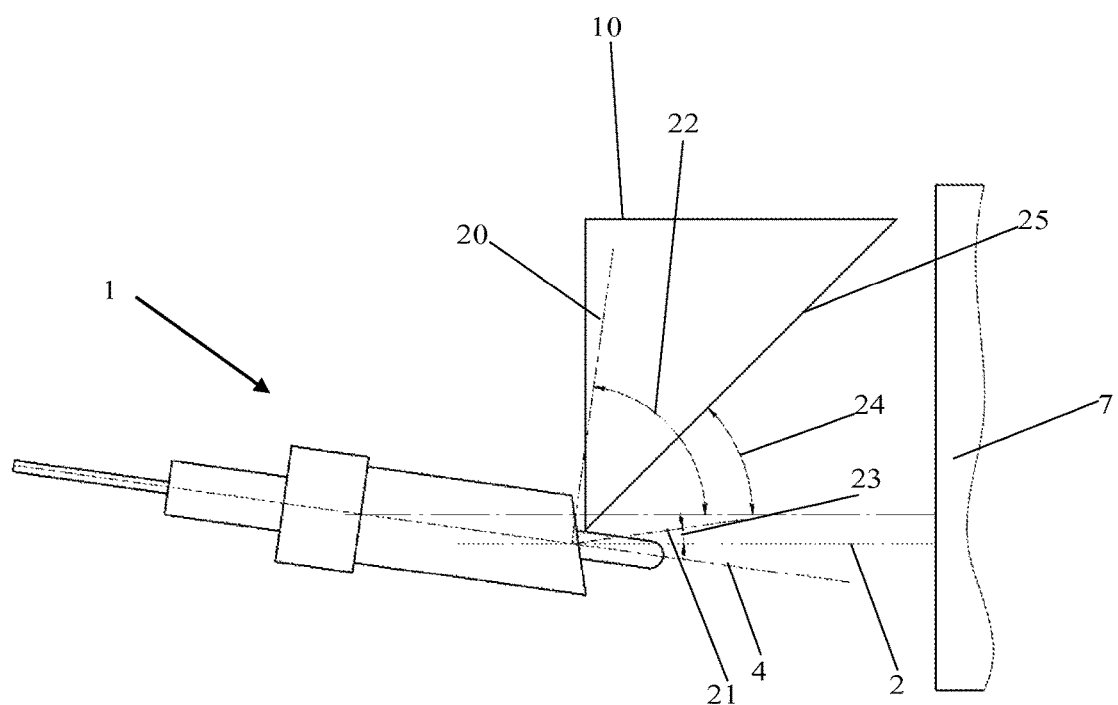
FIG. 11 is a side view of the object being calibrated with illustrated angles which are measured during the calibration procedure.

FIG. 11 illustrates the angles Y measured during the calibration of the mirror surface angle. The side view of the connector and fixture is provided. The angles along the axis X are defined similarly.

Reference number 2 represents optical axis of interferometric microscope 7. The multi-fiber connector or ferrule 1 is inserted into a special fixture with a mirror element. For simplicity, only the mirror element 10 of the fixture is shown and all other parts of the fixture are omitted. The mirror surface is designated by the reference number 25.

The angle between the optical axis 2 and the pin axis in mirror 20 is represented by the reference numeral 22. The angle between the line 21 perpendicular to the connector end face is represented by the reference numeral 23. The resulting angle between the mirror surface 25 and the optical axis is represented by the reference numeral 24.

I claim:

1. A method for interferometric measurement of an end face surface angle of multi-fiber optic connectors and ferrules that takes into account parallelism deviation of guide holes in an interferometric system, the method comprising the steps of:

obtaining interferometric data by the simultaneous scanning of a side face of two guide pins of a male connector or two guide pins inserted into two guide holes of a female connector or ferrule and of an end face of a multi-fiber optic connector or ferrule;

calculating at least two relative angles of the two guide pins or the two guide holes with respect to an optical axis of the interferometric system based on the obtained interferometric data;

calculating parallelism deviation angle values of the two guide pins or the two guide holes based on the at least two relative angles of the two guide holes; and calculating end face surface angle values by calculating the angle between a surface end face plane of the multi-fiber optic connectors and ferrules and a reference plane perpendicular to the optical axis of the interferometric system based on the obtained interferometric data and taking into account the parallelism deviation angle values of the two guide holes.

2. The method of claim 1 wherein the multi-fiber connectors or ferrules are positioned in the interferometric system by means of a fixture with a mirror element that turns the image of the side surfaces of the connector or ferrule guide pins for allowing simultaneous scanning of the side face of the guide pins and the end face of the connector or ferrule.

* * * * *